US006771257B2

(12) United States Patent
Krulis

(10) Patent No.: US 6,771,257 B2
(45) Date of Patent: Aug. 3, 2004

(54) APPARATUS FOR DISPLAYING DETECTED WIRES TO AN AIRCRAFT FLIGHT CREW

(75) Inventor: Richard P. Krulis, Morristown, NJ (US)

(73) Assignee: Honeywell International Inc., Morristown, NJ (US)

( * ) Notice: Subject to any disclaimer, the term of this patent is extended or adjusted under 35 U.S.C. 154(b) by 305 days.

(21) Appl. No.: 09/895,042

(22) Filed: Jun. 29, 2001

(65) Prior Publication Data

US 2002/0033808 A1 Mar. 21, 2002

Related U.S. Application Data

(60) Provisional application No. 60/234,393, filed on Sep. 20, 2000.

(51) Int. Cl.[7] .................................................. G09G 5/00

(52) U.S. Cl. ......................................... 345/204; 345/46

(58) Field of Search ................................ 345/204, 205; 340/974, 975, 945, 967

(56) References Cited

U.S. PATENT DOCUMENTS 3,713,161 A * 1/1973 Rice ........................... 342/455
3,737,846 A * 6/1973 Hernandez, Jr. ............ 340/967
3,852,710 A * 12/1974 Hernandez, Jr. ............ 340/967
4,305,057 A * 12/1981 Rolston ...................... 340/974
4,860,007 A 8/1989 Konicke et al. ............ 340/173
4,902,126 A 2/1990 Koechner ...................... 356/5
5,198,812 A * 3/1993 Probert ....................... 340/975
5,315,363 A * 5/1994 Nettleton et al. .......... 356/5.03
5,359,403 A 10/1994 Grosmann et al. ............. 356/5
6,076,042 A 6/2000 Tognazzini ................. 701/301
6,556,222 B1 * 4/2003 Narayanaswami .......... 345/786
6,567,014 B1 * 5/2003 Hansen et al. .............. 340/980

FOREIGN PATENT DOCUMENTS

EP 0 609 162 A2 1/1994 ........... G01S/17/88
JP 11023712 * 1/1999

* cited by examiner

*Primary Examiner*—Richard Hjerpe
*Assistant Examiner*—Ronald Laneau
(74) *Attorney, Agent, or Firm*—Kurt Luther; James W. Falk

(57) ABSTRACT

The pilot or crew of an aircraft is alerted to the danger presented by wires in the vicinity of the aircraft by a flight instrument which includes a plurality of wire detected display elements, advantageously arranged as bars on the face of the flight instrument, and which display elements are color coded according to the level of danger presented to the aircraft by the detected wires.

3 Claims, 5 Drawing Sheets

45
10
10
46
46
40A
40B
41A
41B
42A
42B
10
10
45

APPARATUS FOR DISPLAYING DETECTED WIRES TO AN AIRCRAFT FLIGHT CREW

CROSS-REFERENCE TO RELATED APPLICATIONS

This application claims priority from U.S. Provisional Patent Application Serial No. 60/234,393 entitled, "Apparatus and Method for Displaying Detected Wires to an Aircraft Flight Crew", filed on Sep. 20, 2000. The contents of U.S. Provisional Patent Application Serial No. 60/234,393 are fully incorporated herein by reference.

FEDERALLY SPONSORED RESEARCH OR DEVELOPMENT

Not Applicable

BACKGROUND OF THE INVENTION

1. Technical Field

This invention relates to the field of aircraft displays and more specifically to the representation of wires detected by a wire detection system as seen by an aircraft flight crew.

2. Background Art

Electronic displays are replacing mechanical flight instruments in aircraft (glass cockpit) at an ever-increasing rate. These electronic displays typically display pictorial representations (display formats) of existing instruments, but can also display other formats such as checklists or diagnostics. There are three basic types of aircraft instruments. First, instruments such as altimeters and oil pressure indicators use either pointers or numerical readouts to represent certain aircraft parameter such as altitude or oil pressure. Second, a horizontal situation indicator (HSI) shows a god's eye view of the aircraft with respect to the earth; digital maps also use this god's eye view representation. Third, an attitude indicator (ADI), also known as a vertical situation display, shows a pilot's eye view looking out of the aircraft cockpit; ADI symbology includes simulated sky (blue), earth (brown), and an artificial horizon.

The development of display formats for aircraft flight displays is a fairly rigorous involved process that involves many engineering disciplines including human factors, safety, and avionics design. In the civilian field, the Federal Aviation Administration (FAA) must approve the display formats for all aircraft primary flight instruments such as airspeed, attitude, and altitude. The FAA has issued guidelines for the use of color and other symbol characteristics on electronic flight displays in FAA Advisory Circular 25-2. For military aircraft, the display formats are generally developed during a series of cockpit control working group (CCWG) meetings that consider both civilian and unique military mission requirements.

Graphical display formats that represent pictorial views of conventional mechanical aircraft instruments are known in the prior art. Konicke et al U.S. Pat. No. 4,860,007, Aug. 22, 1989, for example, teaches an integrated primary flight display that includes airspeed, attitude, and altitude on a single format. Further, a prior art attitude director indicator (ADI) display format is shown herein FIG. 1. In the center of the format, an aircraft is symbolically represented, made up of a left wing 1, a right wing 2, and a nose 3. A sky region 11, colored blue, an earth region 12, colored brown, and a horizon line 13, colored white symbolically represent the environment scene outside the aircraft. Aircraft attitude is represented by a moving pitch ladder 14 and a roll pointer 15 in conjunction with a roll scale 16. Basic operation of aircraft attitude indicators is well known in the art and will not be discussed further herein.

The problem of helicopter wirestrikes has existed for many years and has been costly in terms of military hardware and human lives. Loss of helicopters and crew due to strikes against obstacles such as pylons, radio masts and cables is a very serious problem, since actual missions, training exercises and maneuvers of helicopters call for flight profiles below 100 meters and in most cases at or below tree top level. In particular, profiles for combat, search, and rescue missions of military helicopters demand high-speed flight at low altitude for operation below the radar horizon. These helicopters make maximum use of terrain masking to avoid detection. Obstacle avoidance during daylight operation is mainly by visual observation and at night by means of night vision goggles and thermal imaging systems.

Taught in the prior art are various methods and systems that are designed to detect wires, specifically for use in helicopters, such as disclosed in Koechner U.S. Pat. No. 4,902,126, Feb. 20, 1990. However, none of the prior art systems disclose any specific method, apparatus, or display format for displaying detected wires to an aircraft pilot.

SUMMARY OF THE INVENTION

My invention consists of an improved vertical situation display apparatus with associated display formats for quickly conveying to an aircraft pilot the output from a wire detection system.

A vertical situation display apparatus in accordance with my invention is especially suitable for helicopters that are conducting low-level operations near populated areas. Advantageously, this invention can be combined with an active laser wire detection system. Also advantageously, my invention can be implemented on non-glass cockpit aircraft by installation of a bezel ring on one or more of the existing attitude director indicators (ADI).

DETAILED DESCRIPTION OF THE INVENTION

Mode(s) for Carrying Out the Invention

Figure 1:
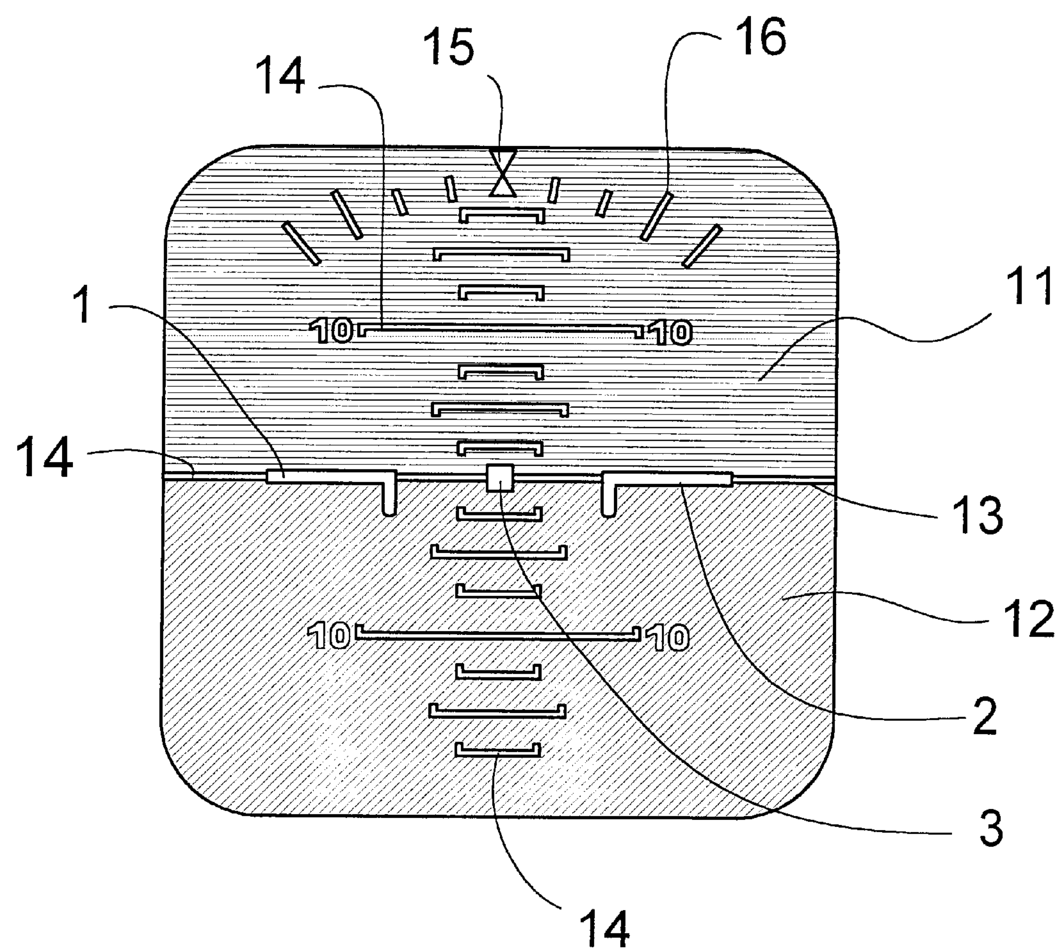
FIG. 1 illustrates a prior art attitude indicator display format suitable for display on an electronic flight instrument system (EFIS).
Figure 2:
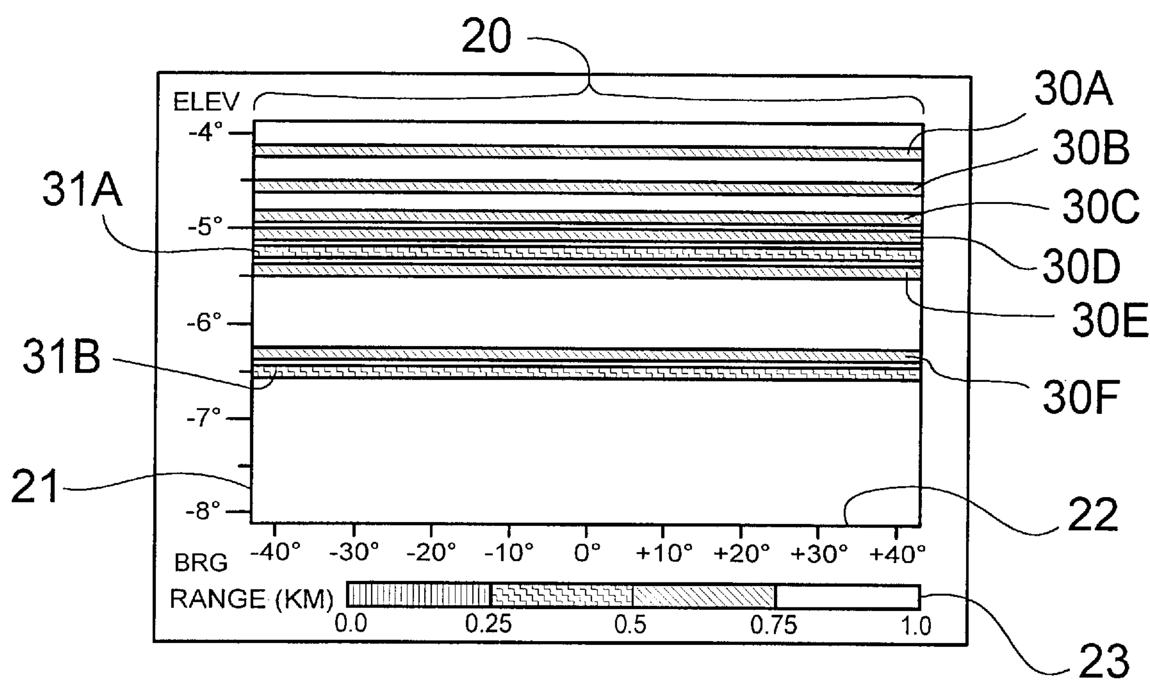
FIG. 2 illustrates a wire detection display format suitable for display on an aircraft multifunction display (MFD), in accordance with one illustrative embodiment of my invention.

Referring to FIG. 2, which shows one embodiment of my invention, a display format including a grid 20 with x-coordinate of relative bearing 21 and y-coordinate of relative pitch elevation angle 22 is shown. Additionally, a colored range legend 23 and a number of colored wire-detected bars (30A–30F, 31A and 31B) are shown. Preferably, this display format comprising colored horizontal lines is presented to the aircraft pilot on a 5-inch by 7-inch color active matrix liquid crystal display (AMLCD).

The colors associated with each of the horizontal lines represent the distance from the aircraft to the detected wires as shown in the range legend 23. The detected wires that are located at a maximum detection range, for example 750 meters, are represented by a first color (green). The detected wires that are located at a range that represents a non-immediate threat to the aircraft, for example between 300 to 500 meters, are represented by a second color (yellow). The detected wires that are located at a range that represents an immediate threat to the aircraft are represented by a third color (red). Advantageously, this color scheme gives the aircraft pilot both a sense of urgency regarding the potential threat and also cueing regarding the wire distance.

Figure 3:
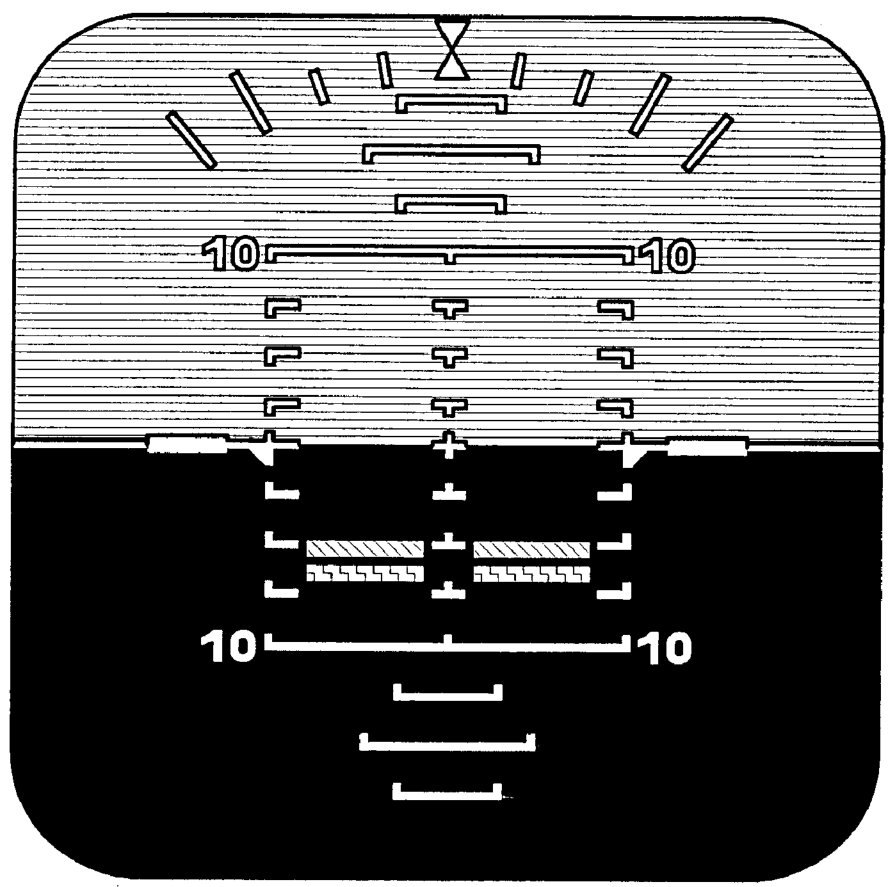
FIG. 3 illustrates an attitude indicator display format with additional wire detection symbology, suitable for display on either an electronic flight instrument system (EFIS) or a multifunction display (MFD), in accordance with an embodiment of my invention.
Figure 4:
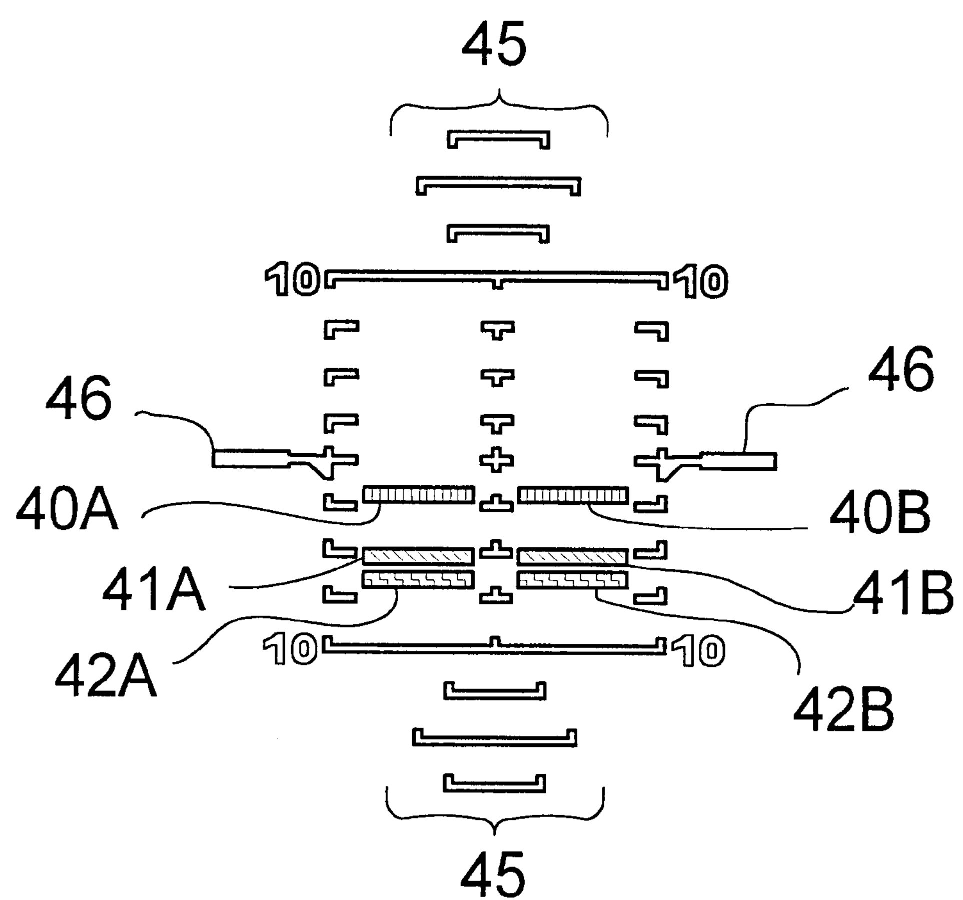
FIG. 4 illustrates wire detection symbology, suitable for use on an attitude indicator display format in accordance with the embodiment of my invention depicted in FIG. 3.

Referring to FIG. 3 and FIG. 4, in this illustrative embodiment of my invention, a set of colored wire detected bars (40A, 40B, 41A, 41B, 42A, and 42B) are represented on a modified ADI pitch ladder 45, in conjunction with a modified aircraft symbol 46.

Figure 5:
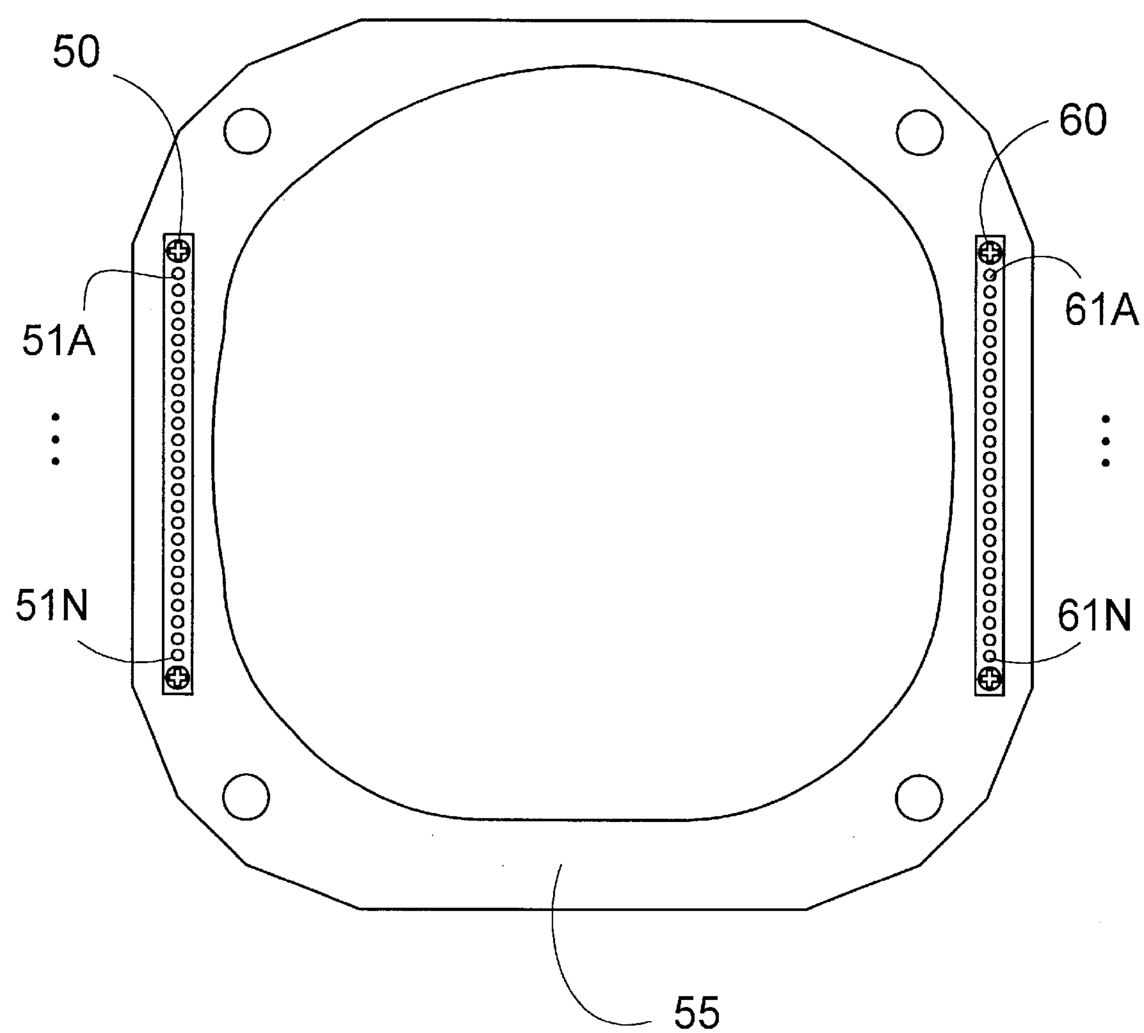
FIG. 5 illustrates a bezel ring, suitable for installation on a mechanical attitude director indicator (ADI) in accordance with an embodiment of my invention.

Referring to FIG. 5, an alternate embodiment of my invention for use with a mechanical attitude indicator (ADI) is shown. The colored wire-detected bars, discussed previously, are replaced with a left vertical column 50 of indicating elements 51A–51N, such as light emitting diodes (LED) and a right vertical column 60 of indicating elements 61A–61N, such as LEDs 61A–61N, where both the left and right vertical columns are mounted on the front face 55 of an ADI bezel ring. Advantageously, each LED is capable of displaying three colors, red yellow, and green. In a further embodiment of my invention, designed for installation in front of a mechanical ADI, each LED incorporates a night vision goggle (NVG) filter.

In order to use my invention, an aircraft equipped with a wire detection system is operated in the vicinity of wires. First, the existing wire detection system in the aircraft provides range, elevation and azimuth data for each of the detected wires. Second, a computer in the aircraft converts the range data provided by the wire detection system into an urgency level such as an advisory, a caution, or a warning, as is known. Next, the aircraft computer converts the azimuth and elevation data into relative bearing and relative pitch elevation angle. Finally, the urgency level, relative bearing and relative pitch elevation angle of each detected wire are presented to the pilot in the form of wire-detected bars by either an attitude display format or the bezel of a mechanical ADI, in accordance with my invention and as described previously.

Alternate embodiments may be devised without departing from the spirit or the scope of the invention.

What is claimed is:

1. A attitude indicator for an aircraft for alerting a pilot to detected wires in the vicinity of the aircraft, said indicator comprising:

(a) a front mounted bezel ring;

(b) a first plurality of light emitting indicating elements configured as a vertical column and located on one side of the front face of said bezel ring; and (c) a second plurality of light emitting indicating elements configured as a vertical column and located on the opposite side of the front face of said bezel ring, the color emitted by said light emitting indicating elements indicating the level of danger presented to the aircraft by the wires.

2. The attitude indicator of claim 1, wherein said light emitting indicating elements comprise light emitting diodes.

3. A mechanical attitude director indicator in an aircraft for alerting a pilot to the presence of wires in the vicinity of the aircraft, said mechanical attitude director indicator comprising:

(a) a plurality of individual light emitting display elements, said individual display elements emitting different colors according to the level of danger presented to the aircraft by the wires; and (b) a bezel ring;

wherein said light emitting display elements comprise vertical columns on opposite sides of said bezel ring.

* * * * *